May 6, 1941.  B. STECHBART  2,241,224
FILM SPLICING DEVICE
Filed April 7, 1937  2 Sheets-Sheet 2
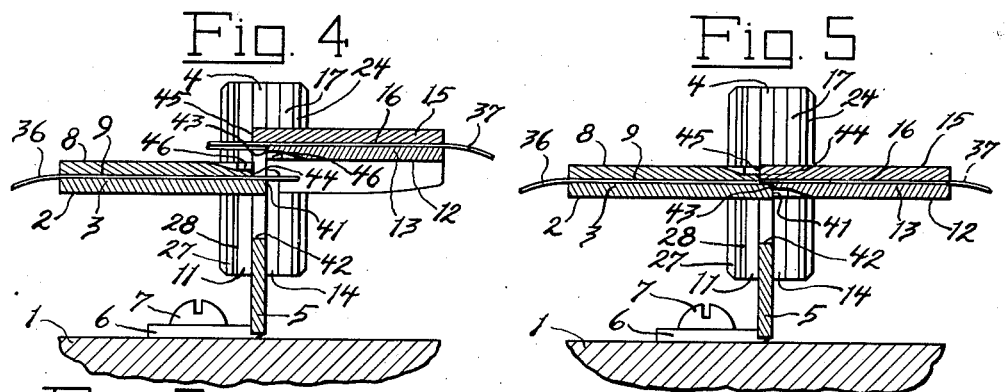
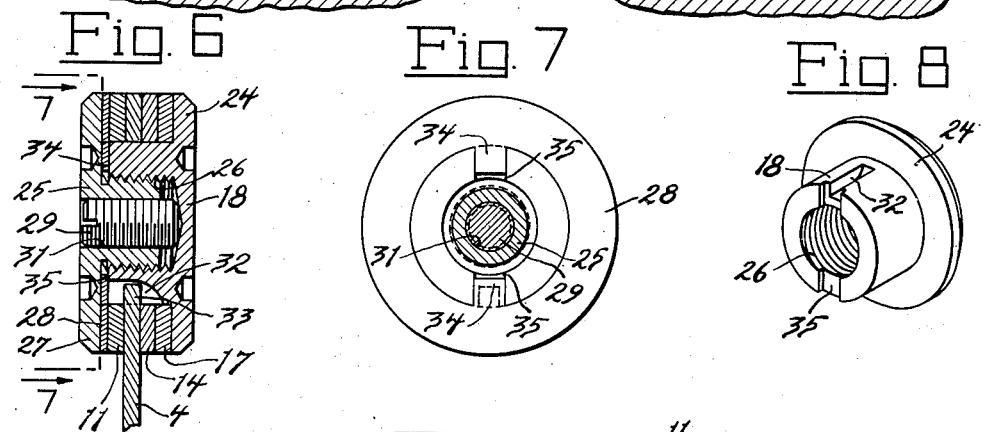
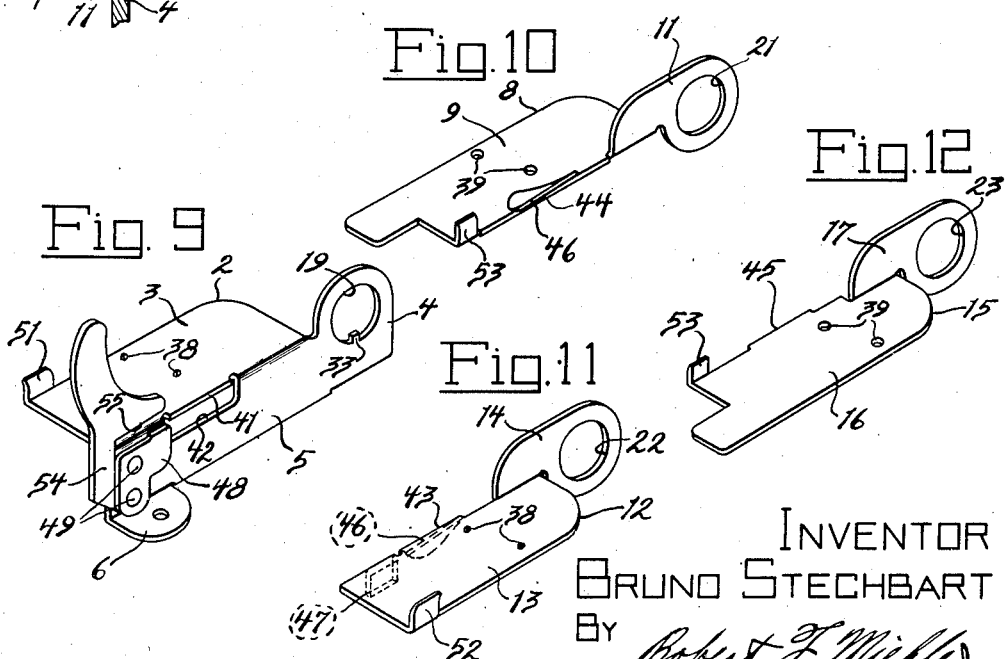
INVENTOR
BRUNO STECHBART
BY
ATTY.

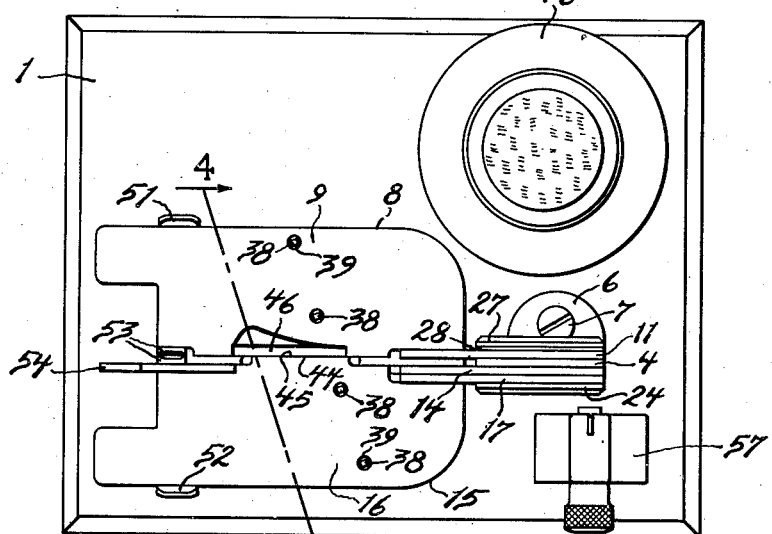
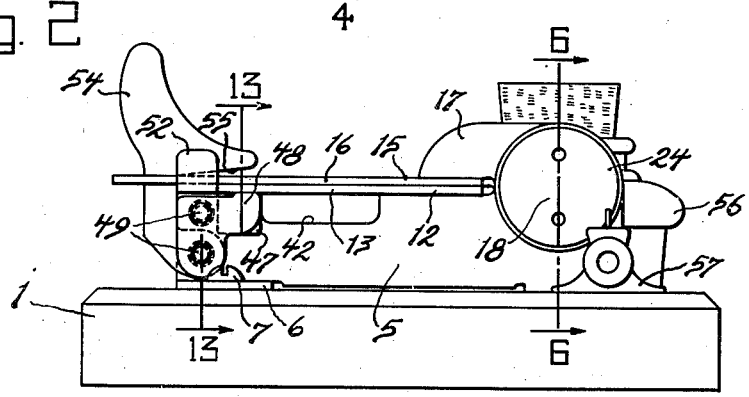
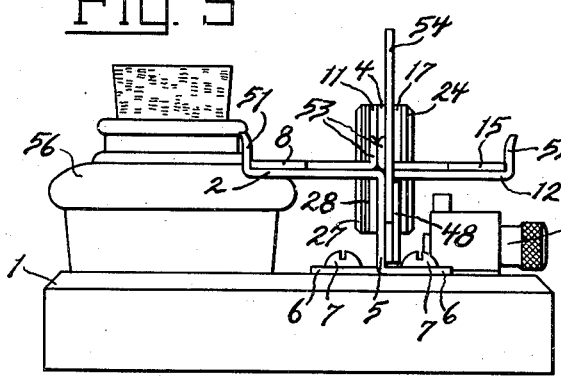

Patented May 6, 1941

2,241,224

UNITED STATES PATENT OFFICE 2,241,224

FILM SPLICING DEVICE

Bruno Stechbart, Chicago, Ill., assignor to The Bell & Howell Company, Chicago, Ill., a corporation of Illinois Application April 7, 1937, Serial No. 135,520

3 Claims. (Cl. 154—42)

My invention relates particularly to motion picture film splicers although not limited to this use alone.

The general object of the invention resides in the provision of a novel and practical film splicing device, particularly with a view toward accuracy, convenience in use, and economy of manufacture.

With this object in view my invention consists in certain features of novelty in the construction, combination and arrangement of parts by which the said object and certain other objects, hereinafter appearing, are effected, all as fully described with reference to the accompanying drawings and more particularly pointed out in the appended claims.

In the said drawings—

Figure 1 is a top plan view of a splicing device embodying my invention;

Figure 2 is a side elevation of the same;

Figure 3 is a front elevation of the same;

Figures 4 and 5 are partial sections substantially on the line 4—4 of Figure 1 and showing parts in different positions;

Figure 6 is a partial section substantially on the line 6—6 of Figure 2;

Figure 7 is a sectional view substantially on the line 7—7 of Figure 6 with parts removed;

Figure 8 is a perspective view of the axle member of the device, hereinafter described;

Figures 9, 10, 11 and 12 are perspective views of the several film clamping and shearing members of the device, hereinafter described; and Figure 13 is a section substantially on the line 13—13 of Figure 2.

Referring to the drawings, I designates a base which is preferably formed of wood. A film clamping member 2, see particularly Figure 9, is formed of flat or sheet metal stock and involves a film clamping portion 3, a pivot portion 4 bent at a right angle to the clamping portion 3, and a support portion 5 also bent at a right angle to the clamping portion 3 and, as shown, forming an extension of the pivot portion 4.

The support portion 5 is provided with apertured lugs 6 bent therefrom in parallelism with the clamping portion 3, and headed screws 7, passing through the apertures of the lugs 6 and screwthreaded into the base 1, serve to secure the clamping member 2 on the base with the clamping portion 3 elevated above the base.

A second film clamping member 8 is formed of flat or sheet metal stock and involves a film clamping portion 9 and a pivot portion 11 bent at a right angle to the clamping portion 9. See particularly Figure 10.

A third film clamping member 12 is formed of flat or sheet metal stock and involves a film clamping portion 13 and a pivot portion 14 bent at a right angle to the clamping portion 13. See particularly Figure 11.

A fourth film clamping member 15 is formed of flat or sheet metal stock and involves a film clamping portion 16 and a pivot portion 17 bent at a right angle to the clamping portion 16. See particularly Figure 12.

Pivot mounting means is associated with the pivot portions 4, 11, 14 and 17 of the clamping members, whereby the clamping members are relatively movable, and consists as follows.

An axle member 18 extends through apertures 19, 21, 22 and 23 in the pivot portions 4, 11, 14 and 17 of the clamping members, and is provided with a circumferential thrust bearing flange 24. See particularly Figures 6 to 12 inclusive.

A thrust bearing member 25 is screwthreaded in an axial bore 26 extending partially through the axle member 18 and is provided with an opposing circumferential thrust bearing flange 27, the flanges 24 and 27 axially confining the aforesaid pivot portions of the clamping members and a spring bearing washer 28 interposed between the flange 27 and the pivot portion 11. A set screw 29 is screwthreaded through an axial bore 31 of the thrust bearing member 25 and engages the bottom of the bore 26 to lock the member 25 in axially adjusted position with reference to the axle member 18 for effecting a thrust bearing adjustment of the aforesaid pivot mounting means. See Figures 6, 7 and 8.

The clamping member 2 forms a support for the other clamping members and the pivot mounting means above described, and the axle member 18 is provided with a keyway 32 which is engaged by an integral key 33 of the clamping member 2 for angularly fixing this clamping member and the axle member. The bearing washer 28 is also angularly fixed with the axle member by reason of diametrically opposite integral keys 34 thereof engaging a diametrical end slot 35 of the axle member.

The clamping members 2, 8, 12 and 15 are, as described, relatively movable angularly and comprise in addition shearing members and function similarly to those described and claimed in U. S. Patent No. 1,275,431, for Splicing apparatus for cinematographic films, issued on application of Albert S. Howell, and accordingly but a brief description is necessitated herein.

The clamping members 2 and 8 coact to clamp one film portion 36, and the clamping members 12 and 15 coact to clamp another film portion 37, the clamping members 2 and 12 being provided with film perforation engaging teeth 38 for accurately locating the film portions and the clamping members 8 and 15 being provided with apertures 39 into which the teeth 38 project when the pairs of clamping members are in clamping relation.

The opposing edges of the pairs of clamping members are offset to the end that the clamping member 15 overlaps the clamping member 2 for clamping correspondingly overlapping ends of the film portions 36 and 37 in overlying relation for the cementing of the film ends, as illustrated in Figure 5, and, to the end of shearing the film ends, the aforesaid opposing edges of the clamping members are provided with shearing edges. These shearing edges comprise a shearing edge 41 on the clamping member 2 which involves an opening 42 in the support portion 5 of this member, an opposing shearing edge 43 on the member 12 cooperating with the shearing edge 41, a shearing edge 44 on the member 8, and a shearing edge 45 on the member 15 opposing the shearing edge 44.

In order to diminish the power necessary to shear the film ends, the members 8 and 12 are milled, as designated at 46, to increase the angularity of shearing action with reference to the pivotal axis of the clamping members.

The aforesaid pivotal mounting means of the clamping members includes axial thrust bearing means, and in order to prevent separation of the clamping members in the planes of their clamping portions, additional thrust bearing means is provided which is operative between the clamping members and which is disposed radially remote from the pivot mounting means and, as shown, opposite thereto with reference to the film clamping region of the clamping members.

Accordingly, the clamping member 12 is provided adjacent its free end with a lug 47 bent at a right angle downwardly from the clamping portion thereof. A lug or plate 48 is secured in spaced relation on the support portion 5 remote from the aforesaid pivot mounting means by means of intermediately enlarged and shouldered rivets 49. See Figures 2, 9, 11 and 13. The lug 47 engages between the support portion 5 and the lug 48 when the clamping members 2 and 12 are in shearing and substantially alined relation, as shown in Figures 4 and 5, to form a thrust bearing between these clamping members disposed radially remote from the aforesaid pivot mounting means, thus prevent lateral separating movement of these clamping members.

The clamping member 2 is provided at the end thereof radially remote from the aforesaid pivot mounting means with a lug 51 bent at a right angle upwardly from the outer side edge of the clamping portion thereof, and this lug is engaged by the outer side edge of the clamping portion of the clamping member 8 when the clamping members 2 and 8 are in clamping relation to oppose lateral movement of the clamping member 8 in the plane of its clamping portion away from the clamping members 12 and 15.

The clamping member 12 is provided at the end thereof radially remote from the aforesaid pivot mounting means with a lug 52 bent at a right angle upwardly from the outer side edge of the clamping portion thereof, and this lug is engaged by the outer side edge of the clamping portion of the clamping member 15 when the clamping members 12 and 15 are in clamping relation to oppose movement of the clamping member 15 in the plane of its clamping portion away from the clamping members 2 and 8.

The clamping members 8 and 15 are provided at the ends thereof radially remote from the aforesaid pivot mounting means with lugs 53 bent at right angles upwardly from the inner side edges of the clamping portions thereof, and these lugs are adapted to engage in the region of alinement of the planes of the clamping portions thereof to afford thrust bearing opposition to the lugs 47, 48, 51 and 52.

To the end of securing the overlapping film ends for the setting of the cement applied thereto, a locking member 54 is pivoted on the intermediate portion of one of the rivets 49 and is provided with a cam locking portion 55 which engages the free end of the clamping member 15 to releasably lock all of the clamping members in splice clamping relation for the setting of the splicing cement, as in Figure 5.

To the end of facilitating operation of the device, a cement container 56 is mounted on the base 1, and an emulsion scraper 57 is removably seated on the base 1 for scraping the photographic emulsion from one of the film ends preparatory to the final splicing operation.

Having thus described my invention, I do not wish to be limited to the precise details described as changes may be readily made without departing from the spirit of my invention, but having thus described my invention, I claim as new and desire to secure by Letters Patent the following:

1. In a film splicing device, the combination with a plurality of film engaging members, of pivot mounting means whereby said engaging members are relatively movable, said mounting means comprising an axle member extending through apertures in said engaging members and provided with a circumferential thrust bearing flange, a thrust bearing member screwthreaded in an axial bore extending partially through said axle member and provided with an opposing circumferential thrust bearing flange, and a set screw screwthreaded through an axial bore of said thrust bearing member and engaging the bottom of said first mentioned axial bore to lock said thrust bearing member in axially adjusted position.

2. In a film splicing device, the combination with a plurality of film engaging members one of which forms a supporting member, of pivot mounting means whereby said engaging members are relatively movable, said mounting means comprising an axle member extending through apertures in said engaging members and provided with a circumferential thrust bearing flange, a thrust bearing member mounted in an axial bore of said axle member and provided with an opposing circumferential thrust bearing flange, and a slide key engagement between said supporting member and said axle member and angularly fixing the same.

3. In a film splicing device, the combination with a plurality of film engaging members one of which forms a supporting member, of pivot mounting means whereby said engaging members are relatively movable, said mounting means comprising an axle member extending through apertures in said engaging members and provided with a circumferential thrust bearing flange, a thrust bearing member mounted in an axial bore of said axle member and provided with an opposing circumferential thrust bearing flange, means for adjustably positioning said thrust bearing member axially of said axle member, and a slide key engagement between said supporting member and said axle member and angularly fixing the same.

BRUNO STECHBART.